United States Patent [19]

Zahid

[11] 4,348,792

[45] Sep. 14, 1982

[54] METHOD OF MAKING LOW COST ACCUMULATOR

[75] Inventor: Abduz Zahid, Los Angeles, Calif.

[73] Assignee: Greer Hydraulics, Incorporated, Chatsworth, Calif.

[21] Appl. No.: 207,883

[22] Filed: Nov. 18, 1980

[51] Int. Cl.³ .................... B21D 53/00; B21K 29/00; B23P 15/26

[52] U.S. Cl. .................... 29/157 R; 29/458; 138/30; 264/135; 264/267; 264/269; 264/271.1

[58] Field of Search ............ 29/458, 157 R; 138/30; 264/134, 135, 267, 268, 271, 269

[56] References Cited

U.S. PATENT DOCUMENTS

| | | | |
|---|---|---|---|
| 3,034,558 | 5/1962 | Steer et al. | 264/267 X |
| 3,074,840 | 1/1963 | Teplansky et al. | 264/135 X |
| 3,425,593 | 2/1969 | Kramer et al. | 138/30 X |
| 3,689,625 | 9/1972 | Zipper | 264/268 |
| 3,868,972 | 3/1975 | Zirps | 138/30 |
| 3,920,047 | 11/1975 | Mercier | 138/30 |
| 4,077,100 | 3/1978 | Zahid | 29/157 R |
| 4,288,894 | 9/1981 | Jacobellis | 29/157 R |

Primary Examiner—Charlie T. Moon
Attorney, Agent, or Firm—Arthur B. Colvin

[57] ABSTRACT

The present invention is directed to a low cost accumulator device and the method of making the same. The device is fabricated by utilizing the shell or pressure vessel as a mold component wherein a bladder is molded in situ, the bladder being bonded in the course of the formation thereof to the interior of the vessel and preferably also to a valve member.

3 Claims, 4 Drawing Figures

METHOD OF MAKING LOW COST ACCUMULATOR

BACKGROUND OF THE INVENTION

1. Field of the Invention

The present invention is in the field of hydraulic accumulator devices and pertains more particularly to a hydraulic accumulator which is inexpensive to fabricate, and to the method of making the same.

2. The Prior Art

The use of accumulator devices in various hydraulic applications is progressively increasing. Heretofore the relatively costly nature of accumulators has discouraged their use in certain environments and applications where cost is a significant factor.

Typically, an accumulator comprises a pressure vessel or shell divided into two chambers by a resilient bladder member, one said chamber being connected to a gas charging port having a valve and the other said chamber being connected to an oil port which is, in turn, adapted to be connected to a hydraulic line.

Mounting of the bladder within the vessel has usually been accomplished by providing a retainer ring or the like to which the open mouth portion of the bladder is connected either by bonding or molding thereover. The retainer is thereafter secured at a desired position within the shell as by welding.

Thereafter a cover member is affixed to the open mouth portion of the device.

The operation of separately forming the bladder and retaining ring assembly and securing the retaining ring in position has added materially to the cost of fabrication. This is especially true where the ring is weldingly connected to the pressure vessel since great care must be taken in the course of formation of the weld to avoid communicating undue heat to the bladder.

SUMMARY OF THE INVENTION

The present invention may be summarized as directed to a low cost accumulator device and method of making the same characterized in that the pressure vessel member or shell is used in the formation of the bladder as a female mold component and that the bladder molded in situ within the pressure vessel, and the operation of affixing the mouth of the bladder to the pressure vessel is effected as an integral step in the bladder fabricating operation.

The invention further contemplates the integration of a valve member onto the bladder material during formation of the bladder.

Accordingly, it is an object of the present invention to provide a low cost accumulator device.

A further object of the invention is the provision of a method of manufacturing a low cost accumulator device wherein the bladder is molded in situ, utilizing the pressure vessel itself as a mold defining component.

A further object of the invention is the provision of a method and apparatus of the type described wherein the bladder is attached to and permanently positioned within the pressure vessel and also to a rigid valve member in the same operation wherein the bladder is molded, the valve member forming a component of the mold.

To attain these objects and such further objects as may appear herein or be hereinafter pointed out, reference is made to the accompanying drawings, forming a part hereof, in which.

Figure 3:
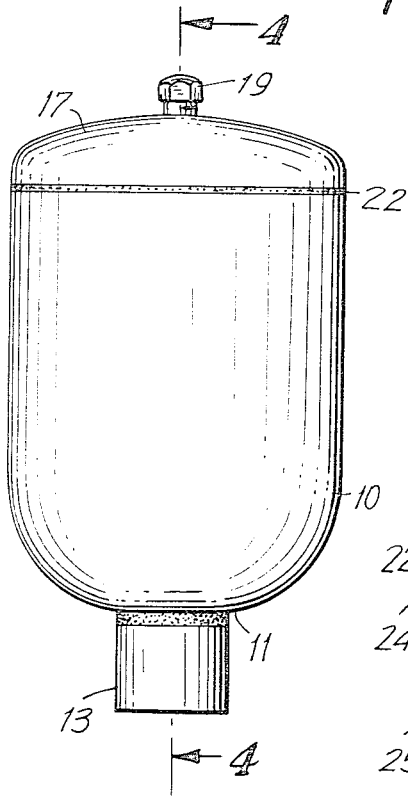
FIG. 3 is a side elevational view of a completed accumulator in accordance with the invention.
Figure 4:
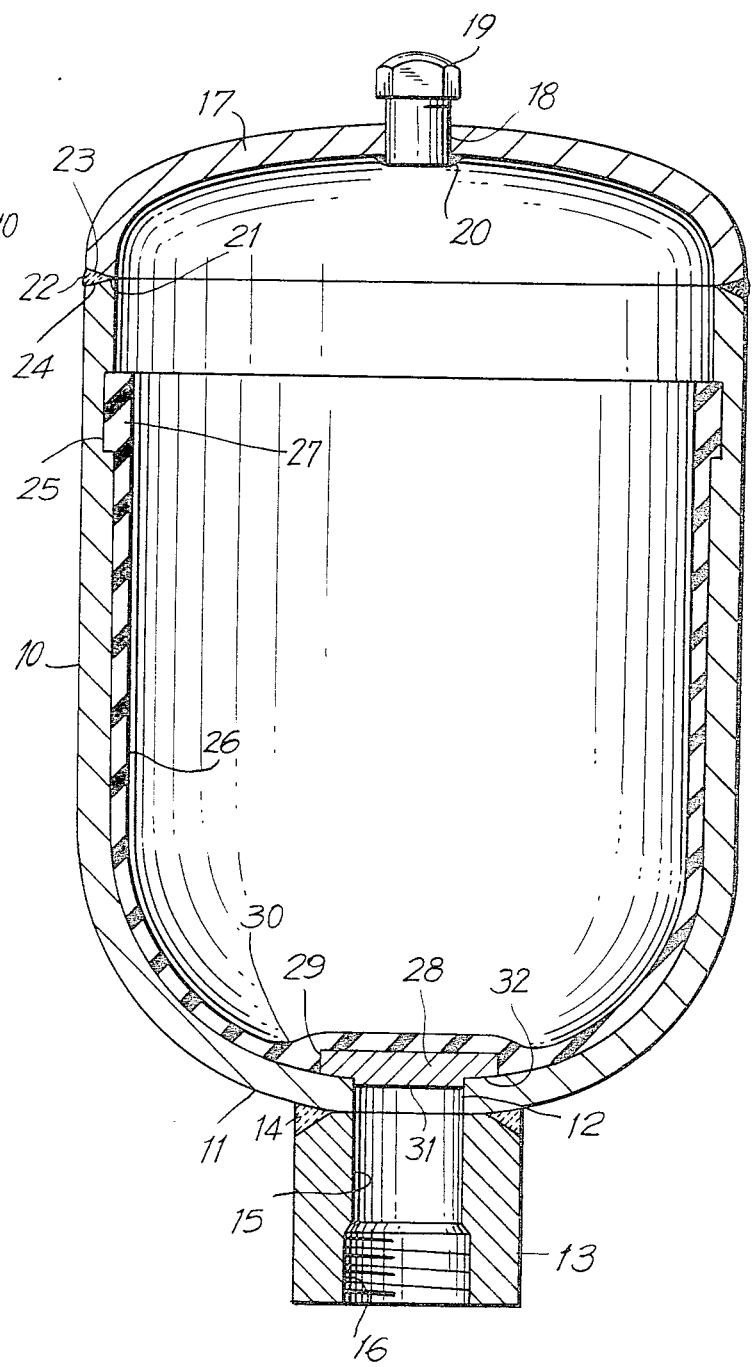
FIG. 4 is a magnified vertical section taken on the line 4—4 of FIG. 3.

Referring now to the drawings, there is disclosed in FIGS. 3 and 4 a simple accumulator device comprising a pressure vessel 10 having a generally hemispherical lower portion 11, within which is formed an oil port 12. A fitting 13 is connected, as by weld 14, to the lower end of the accumulator, the fitting including an internal passage 15 forming a continuation of the oil port 12. The fitting 13 may be internally threaded as at 16 for attachment to the conduit of a hydraulic system.

The accumulator includes a top or cap portion 17 having a gas charging port 18 formed therein, the gas charging valve assembly 19 being mounted as by annular weld 20 in the port 18.

The cap 17 is secured to the upper end or mouth 21 of the shell as by annular weld 22. To facilitate formation of the weld the cap may include an inwardly beveled shoulder 23 and a juxtaposed portion of the shell may include an inwardly directed bevel 24, providing a receiving space for the weld material.

The shell 10 includes an annular recess 25 forming an anchoring point for the bladder member 26.

As shown, the bladder includes a thickened mouth portion 27, the radially outermost surface of which is bonded to the shell portions defining the annular groove 25 in a manner hereinafter described.

A valve member 28 is secured within a recess 29 formed in the lower end 30 of the bladder 26. The valve member 28 may include a depending cylindrical portion 31 which is seated within and fits with minimal clearances in the oil port 12.

The valve 28 includes in addition an annular surround surface 32 which intimately engages the walls of the shell surrounding the oil port 12.

The valve member is bonded to the material defining the bladder in the manner hereinafter described.

Figure 1:
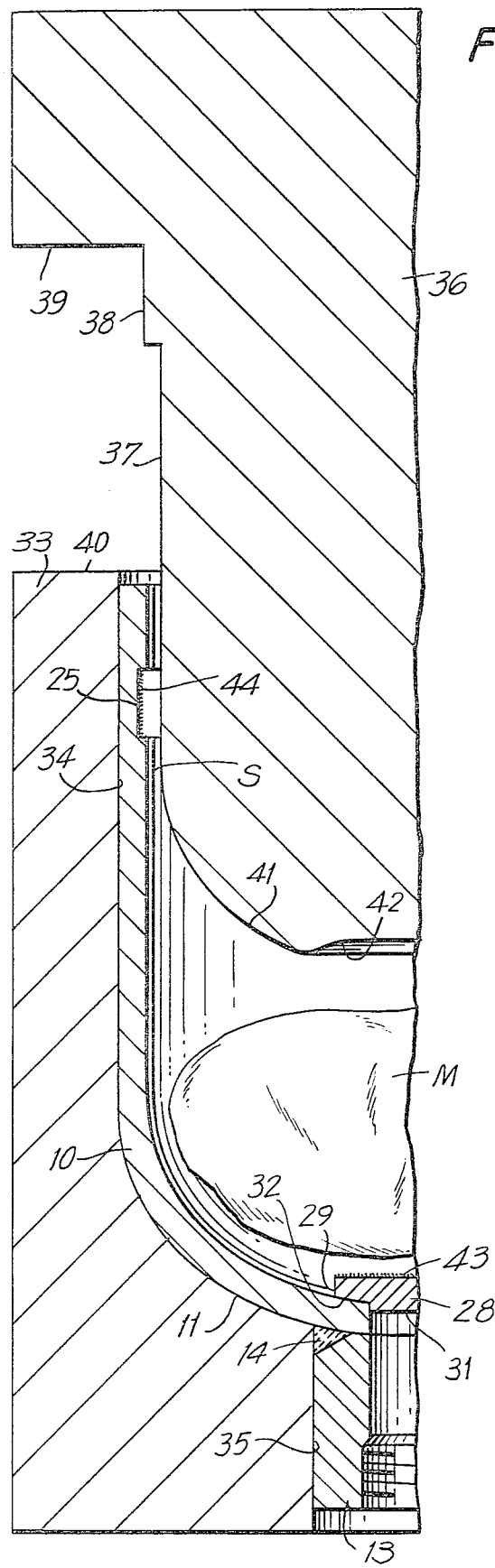
FIG. 1 is a vertical sectional view through a molding apparatus for forming a pressure vessel in accordance with the invention, the parts being disclosed in the partially closed position of the mold.
Figure 2:
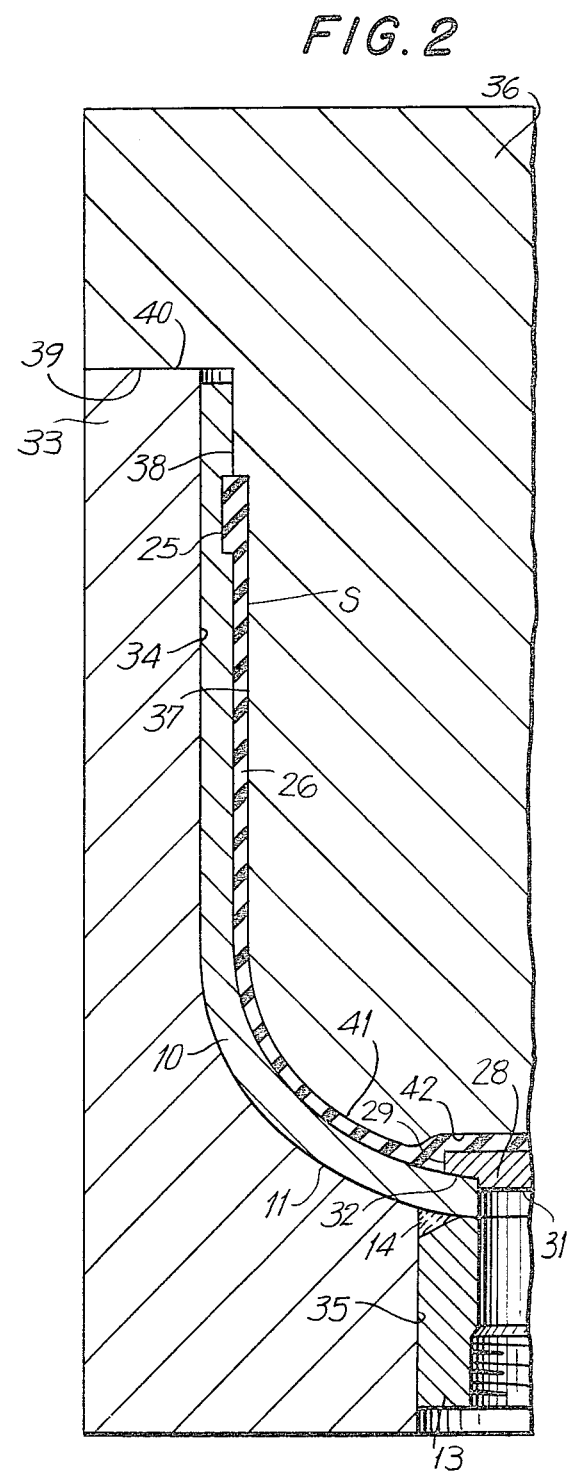
FIG. 2 is a sectional view similar to FIG. 1 showing the position of the parts in the closed condition of the mold.

Referring now to FIGS. 1 and 2 which pertain to the mode of formation of the accumulator, there is provided a female master mold member 33 having an internal recess 34 shaped precisely to receive the outer wall portions of the shell 10. The master mold 33 includes walls defining a depending cylindrical space 35 for accommodation of the fitting 13 which has previously been welded to the shell as described.

The shell member 10 is loaded into the master mold 33 as shown, and is preheated to raise the temperature of the shell to a degree suitable for the molding of the elastomeric prepolymer, which is known per se. A number of suitable prepolymer compositions for the formation of elastomeric compositions are known.

The valve member 28 is positioned in the oil port 12 so as to seal the oil port.

The fabricating apparatus includes a male mold member 36 comprising a cylindrical body portion 37, a sealing collar 38 and a downwardly directed stop shoulder 39 positioned n opposition to the upwardly directed shoulder 40 formed on the master mold 33. The lower end 41 of the male mold member 36 includes a recess 42 for purposes which will become apparent.

The bladder member 26 is molded in situ in the described apparatus in the following manner.

The shell member 10 is first loaded into the master mold 33, the fitting 13 passing downwardly into the cylindrical space 35. Valve member 28 is loaded into closing relation of the oil port 12, the exposed upper and side surfaces of the valve member 28 having previously been covered by a layer 43 of liquid bonding agent selected to be compatible both with the material of the valve member 28, which is normally fabricated of metal, and the elastomeric composition to be used. Similarly a layer 44 of bonding agent is distributed within the recess 25.

Thereafter, a mass M of elastomeric prepolymer is deposited into the interior of the shell. The shell is preferably preheated as a result of its contact with master mold 33. Thereafter the male mold member 36 is lowered into the interior of the shell 10 under pressure, with the result that the mass M of elastomeric prepolymer is distributed upwardly into the spaces defined between the shell and the male mold member 36.

As is conventional, the quantity of material forming the prepolymer mass M may be slightly in excess of the volume of space defined between the male mold 36 and the shell 10 whereby small increments of the prepolymer are extruded upwardly, out of the mold forming a flash which is cut away after cure.

The parts, after closing of the mold, will have advanced to the position shown in FIG. 2. As shown in such figure, the prepolymer has in effect been molded to define the bladder 26 and the areas of prepolymer juxtaposed to the adhesive or bonding layers 43, 44 will have become cured and bonded to the adhesive substances selected.

The mold is retained in the closed position for a time, pressure and heating cycle sufficient to cause polymerization of the elastomer, the degree of penetration or downward movement of the male mold part 36 relative to the master mold 33 being controlled by the interaction of the shoulders 39, 40.

As a result of the molding cycle, the button or valve 28 will have become bonded to the bladder and the thickened rim area 27 adjacent the mouth of the bladder will have been bonded to the recess portion 25 of the shell.

It will be noted that the valve member 28, during the molding procedure, functions as a stopper or seal to prevent or limit extrusion of the prepolymer outwardly through the oil port, it being understood that if any flash should remain in the area surrounding the valve the same may merely be trimmed after cure.

The shell and attached bladder may now be removed from the mold following opening, and the cap member 17 weldingly connected thereto, as previously described.

It will be noted that in the unstressed condition of the bladder the same lines the interior of the shell, unlike the typical construction in which the volume of the interior of the bladder is less than that of the shell and the bladder must accordingly be distended to conform to the confines of the shell. It will thus be observed that the bladder, even after charging with gas, remains in an essentially undistended condition.

As will be apparent to those skilled in the art, numerous variations and modifications may be made in the described method and apparatus. Illustratively, the receiver recess supporting the mouth portion of the bladder may be formed of an undercut or non-reentrant configuration to augment to define the seal connection between the bladder and the shell. In similar fashion, the bladder engaging surfaces of the valve member 28 may be formed with one or more recessed grooves, which may likewise be undercut or non-reentrant.

As noted, the polymeric material of which the bladder is formed should be selected in accordance with the intended end use of the accumulator and particularly, in addition to the normal desirable qualities of elasticity, the bladder material should be selected to be resistant to the liquid reagents with which it will be contacted.

It will be recognized by those skilled in art that still other variations may be made without departing from the spirit of the invention. Accordingly, the same is to be broadly construed within the scope of the appended claims.

Having thus described my invention and illustrated its use, what I claim as new and desire to secure by Letters Patent of the United States is:

1. The method of manufacturing a hydraulic accumulator device of the type which comprises a pressure vessel including an oil port at one end, a gas charging port at the other end and a resilient elastomeric bladder member disposed within said vessel and dividing the same into two chambers in communication, respectively, with said oil port and said gas port, which comprises the steps of providing a pressure vessel in the form of a generally cylindrical shell having an open mouth portion at one end, a restricted orifice defining an oil port at the other end, and an internal annular retainer groove adjacent said open mouth portion, providing a valve button member sized to seal said oil port, seating said button in sealing position of said oil port, applying a bonding agent to the walls defining said groove and to surfaces of said button, thereafter introducing into the interior of said vessel a volumetrically controlled charge of uncured elastomeric prepolymer, thereafter introducing concentrically into said pressure vessel a male mold member sized to define with the interior of said vessel and button a predetermined clearance space, having a volume corresponding substantially to the volume of said change, thereby to distribute said charge of prepolymer into said clearance space, thereafter subjecting said distributed charge to heat and pressure to cause said charge to cure in the shape of a bladder lining said vessel, and to bond said bladder to said button and said annular groove while leaving the remainder of said bladder free of connection to said vessel, and thereafter securing a cap having a gas charging port to said mouth portion of said vessel.

2. The method in accordance with claim 1 wherein said shell is heated prior to the introduction of said prepolymer charge.

3. The method in accordance with claim 2 and including the step of incorporating said pressure vessel in heat transmitting relation in a heated chamber conforming generally to the external dimensions of said shell.

* * * * *